(12) United States Patent
Faucher et al.

(10) Patent No.: US 6,487,926 B2
(45) Date of Patent: Dec. 3, 2002

(54) LOCK PLATE TRANSMISSION

(75) Inventors: Paul Daniel Faucher, Escondido, CA (US); Michael Lee Gustafson, San Diego, CA (US); Stephan Walter Emmenegger, San Diego, CA (US); Allan G. Olson, Camas, WA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/848,009

(22) Filed: May 2, 2001

(65) Prior Publication Data

US 2002/0162411 A1 Nov. 7, 2002

(51) Int. Cl.[7] ................................................. F16H 1/20
(52) U.S. Cl. ....................................................... 74/414
(58) Field of Search .......................... 74/89, 89.16, 405, 74/413, 414, 421

(56) References Cited

U.S. PATENT DOCUMENTS

| | | | | |
|---|---|---|---|---|
| 2,709,923 A | * | 6/1955 | Manning | 29/469 |
| 3,845,668 A | * | 11/1974 | Underwood | 192/46 |
| 4,090,410 A | * | 5/1978 | Nakamura | 271/109 |
| 4,283,149 A | * | 8/1981 | Rethmeier | 235/60.51 |
| 4,729,680 A | * | 3/1988 | Osterlund et al. | 192/20 |
| 4,740,095 A | * | 4/1988 | Matsuura | 101/93.15 |
| 4,798,374 A | * | 1/1989 | Ito | 271/114 |
| 5,062,722 A | * | 11/1991 | Shiozaki et al. | 226/143 |
| 5,131,765 A | * | 7/1992 | Bradley et al. | 400/355 |
| 5,230,576 A | * | 7/1993 | Sone | 400/613 |
| 5,476,253 A | * | 12/1995 | Takemoto et al. | 271/4.01 |
| 6,007,063 A | * | 12/1999 | Park | 271/273 |
| 6,382,619 B1 | * | 5/2002 | Gustafson et al. | 271/117 |

* cited by examiner

Primary Examiner—David A. Bucci
Assistant Examiner—Julie K. Smith

(57) ABSTRACT

A transmission for transmitting rotary power in forward and reverse directions from a programmable source of input motion such as an electric motor uses individually rotatable coaxially mounted lock plates each having a pawl receiving socket therein providing access to an arcuate slot of selected angular length permits engagement and disengagement of the transmission only when input torque is applied thereto in forward and reverse directions to rotate the transmission input gear through pre-defined angles. The pawl is part of a frictionally driven shift arm on which a driven shift gear is also mounted whereby the driven shift gear is pivotally moved into and out of engagement with the output gear or gears of the transmission when the pawl is pivotally moved out of or into the sockets in the lock plates. Rotation limit stops are provided on the lock plates at selected angular positions so that the transmission can be engaged or disengaged for transmission of torque in both forward and reverse directions only when the motor is rotated through a sequence of predetermined angles in predetermined directions.

10 Claims, 4 Drawing Sheets

LOCK PLATE TRANSMISSION

CROSS REFERENCE TO RELATED APPLICATIONS

None.

BACKGROUND OF THE INVENTION

The present invention relates to power transmissions in general and, more particularly, to transmissions useful for transmitting rotary power in forward and reverse directions to computer controlled printers, document scanners, automatic document feeders and other office machine applications. Even more particularly, the invention is applicable for use in applying rotary power to accurately position apparatus such as an inkjet printer service station, to operate a scanner drive, and to operation of a paper pick roller in an automatic document feeder capable of separating single sheets of media such as paper, vellum, transparencies, etc. from a stack thereof.

Inkjet printers ordinarily have a printhead servicing station located at some point on the path of travel of a printhead carriage. The servicing station typically includes printhead wipers, a source of printhead servicing fluid and printhead caps, some or all of which may be mounted on a sled or other moveable support to bring the service station into and out of operating proximity to the printheads to be serviced. Automatic document processing apparatus such as scanners and desktop printers typically include a shelf or tray for holding a stack of one or more sheets of documents to be scanned or blank paper or other media to be fed, one sheet at a time, from the stack to the other portions of the document processing apparatus. In such arrangements a driven pick roller having a friction surface may be used to engage the uppermost sheet in a horizontally oriented or downwardly inclined stack to strip the top sheet from the stack and move it parallel to the surface of the stack. The present invention is particularly useful in printhead servicing apparatus and for driving paper pick rollers and in other applications.

It is objective of the present invention to provide a transmission which can selectively couple and de-couple a source rotary drive power to a rotary output shaft only upon application of predetermined angles of rotation of an input shaft or gear in both forward and reverse directions. The design angles of forward and reverse rotation of the input shaft or gear for engaging the transmission need not be the same as the design angles of forward and reverse rotation for disengaging the transmission.

SUMMARY OF THE INVENTION

The present invention therefore provides a transmission for transmitting rotary power in forward and reverse directions from a source of rotary power to a load comprising:

a) a rotary input gear for coupling to said source of rotary power;
b) a rotary output gear;
c) a clutch shaft;
d) a clutch gear rotatably mounted on said clutch and drivingly engaged with said input gear;
e) at least one lock plate rotatably mounted on said clutch shaft in frictional engagement with said clutch gear, said lock plate having a socket therein including a radially extending gate and an arcuate slot of first selected angular length accessed by said gate;
f) a shift arm pivotally mounted coaxially with said input gear and frictionally engaged with said input gear, said shift arm including a pawl arcuately moveable into and out of engagement with said lock plate socket; and
g) a shift gear engaged with said input gear, said shift gear being mounted on said shift arm and arcuately moveable with said shift arm between positions of engagement and disengagement with said output gear as said pawl moves into and out of said socket.

DETAILED DESCRIPTION OF THE PREFERRED EMBODIMENT

Figure 1:
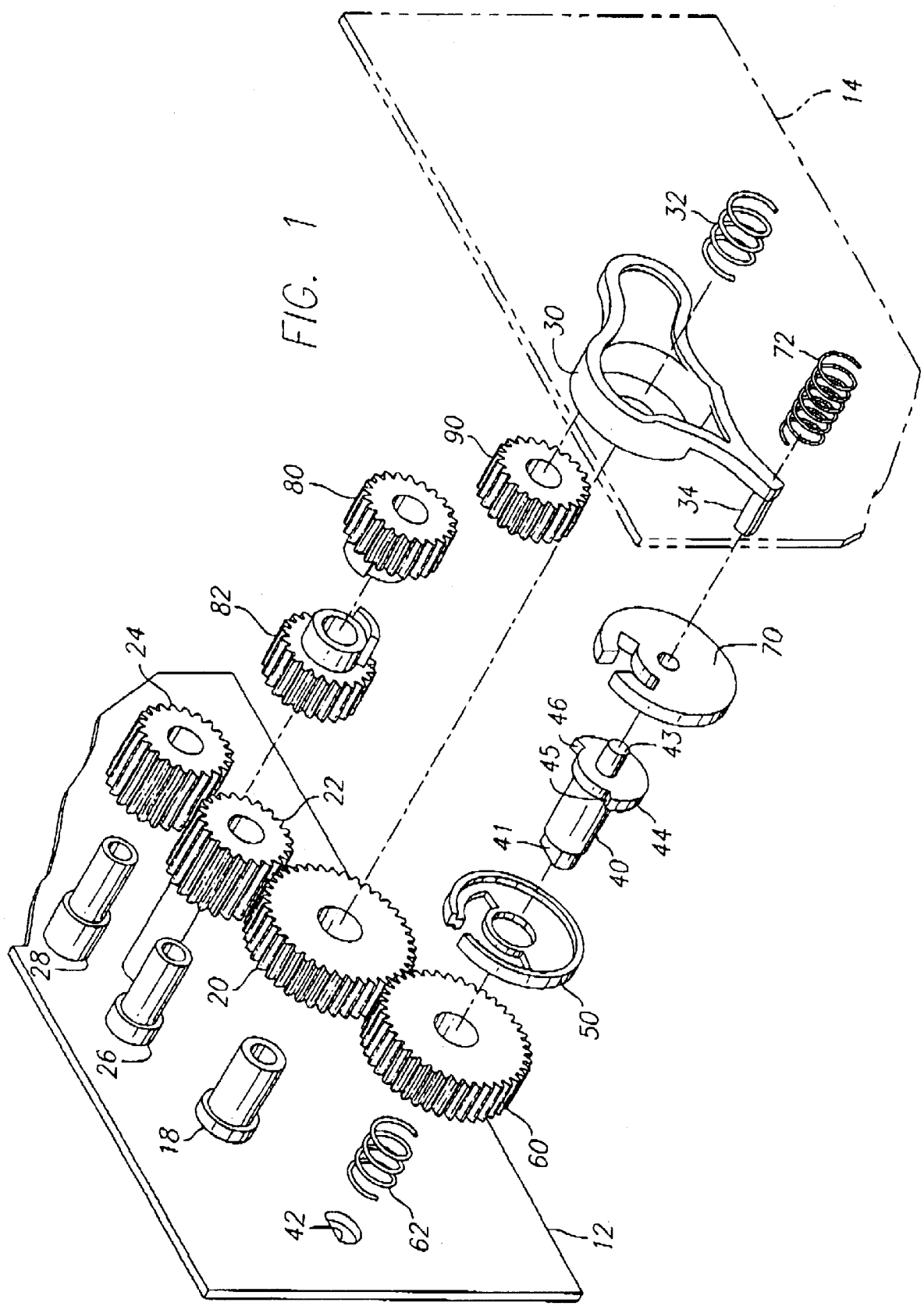
FIG. 1 is a schematic exploded isometric view of a transmission according to the present invention.
Figure 3:
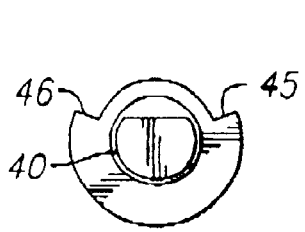
FIG. 3 is a left end elevation view of the shaft of FIG. 2.
Figure 2:
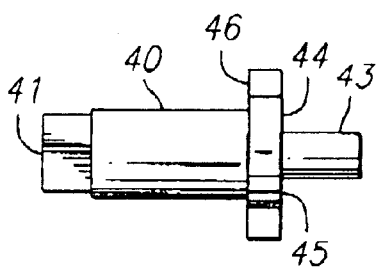
FIG. 2 is a top plan view of a clutch shaft.
Figure 4:
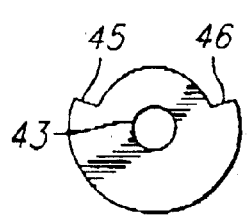
FIG. 4 is a right end elevation view of the shaft of FIG. 2.
Figure 5:
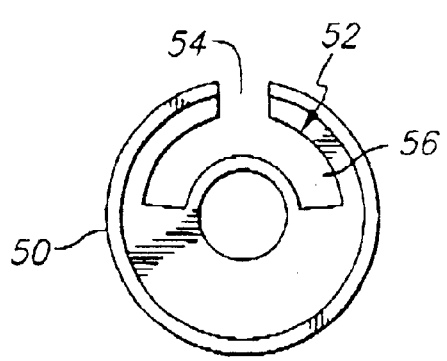
FIG. 5 is a right (outer) side elevation view of an inner lock plate.

The transmission of the present invention preferably is comprised of molded plastic parts such as NYLON®, DELRIN® /POM, polycarborate and is preferably enclosed in a frame or housing of suitable configuration which may include spaced side plates 12, 14 as shown schematically in FIG. 1. In the orientation of the transmission seen in FIG. 1, the side plate 12 will be referred to as an "inner" side plate and the opposite side plate 14 will be referred to as an "outer" side plate as will various other parts of the transmission. The inner side plate 12 has an input gear shaft 18 extending therefrom to receive an input sun gear 20 which is freely rotatable on the shaft 18, and a shift arm 30 which is also freely rotatable on the shaft 18 and is urged by a compression spring 32 seated against the outer side plate 14 into face-to-face frictional engagement with the outer side face of the input or sun gear 20. Optionally, an input gear train comprised of additional input gears 22, 24 respectively supported on shafts 26, 28, in driving relationship with the input sun gear 20 may also be present to receive input torque from a controllable drive motor, not shown.

A specially configured non-rotatable generally cylindrical clutch shaft 40 receives an inner lock plate 50 and a clutch gear 60 which are freely rotatable on the shaft 40, the inner lock plate 50 and clutch gear 60 having abutting surfaces which are urged into frictional engagement with each other by a spring 62. The clutch shaft 40 has an inner end 41 of non-circular configuration received in a complementary configured aperture 42 in the inner side plate 12. Extending from the outer end of the clutch shaft is a cylindrical pin 43 on which is received an outer lock plate 70. The outer lock plate 70 is urged by a spring 72 seated against the outer side plate toward the outer end surface of a rotation limiter shown as a semi-circular disc 44 integrally formed on the clutch shaft 40. As shown, the semi-circular disc 44 has stop shoulders 45, 46 spaced from each other at a selected angle which, as shown, is somewhat less than 180°.

The inner lock plate 50 includes a C shaped socket 52 therein comprised of a radially extending gate 54 and an arcuate slot 56 of selected angular length. Similarly, the outer lock plate 70 also has a socket 72 therein including a radially extending gate 74 and an arcuate slot 76 of selected angular length. As seen in the drawing, the angular length of the outer lock plate slot 76 is significantly shorter than the angular length of the inner lock plate slot 56; however, the relative lengths of the slots 56, 76 in the lock plates 50, 70 are not critical and are selected to coact with programed forward and reverse rotation of the motor which supplies input power to the transmission as will be described below. The clutch gear 60 is continuously engaged with the input sun gear 20 and is thus continuously driven thereby whenever rotary power is supplied in forward or reverse directions to the input gear 20.

An output gear shaft 77 extends from the inner side plate 12 and receives at least one and preferably two mutually engageable output gears 80, 82. When the transmission is engaged, the outer output gear 80 is engaged with a shift gear 90 rotatably supported on the shift arm 30 and the shift gear 90 is continuously engaged with and driven in forward and reverse directions by the sun gear 20. The shift gear 90 is arcuately moved into and out of engagement with the outer output gear 80 as the shift arm 30 pivots on its support shaft 18. The shift arm 30 also includes an integrally formed pawl 34 receivable in the radially extending gates 54, 74 of the inner and outer lock plates 50, 70, the pawl 34 being captured in the arcuate slots 56, 76 of the lock plates when the transmission is engaged. The compression spring 32 seated against the outer side plate 14 urges the shift arm 30 into face-to-face frictional engagement with the input sun gear 20 as previously described.

Figure 12:
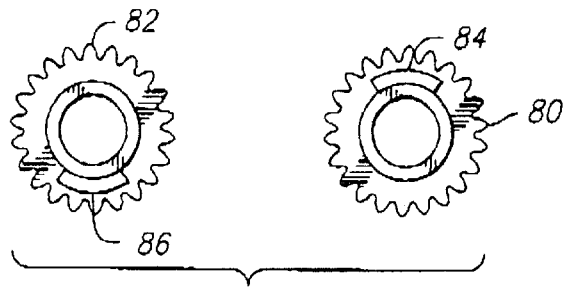
FIG. 12 shows the facing sides of output gears.
Figure 13:
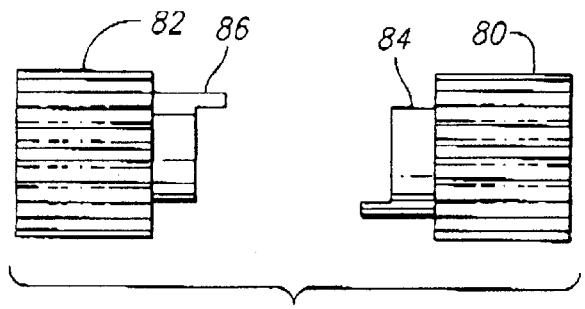
FIG. 13 shows elevation views of the output gears.

A designed-in lag in commencement of and cessation of transmission output may be provided by use of a second or inner output gear 82 which is driven by the outer output gear 80 through the use of axially extending mutually engageable stops 84, 86 of selected angular extent on the facing sides of the outer and inner output gears 80, 82 as best seen in FIGS. 12 and 13.

Figure 6:
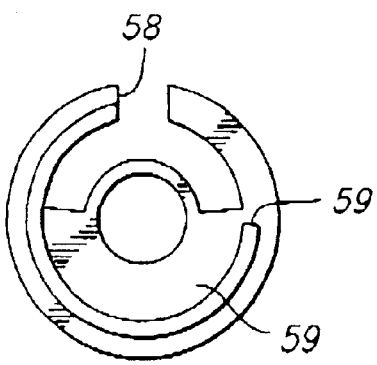
FIG. 6 is a left (inner) side elevation view of the inner lock plate.
Figure 7:
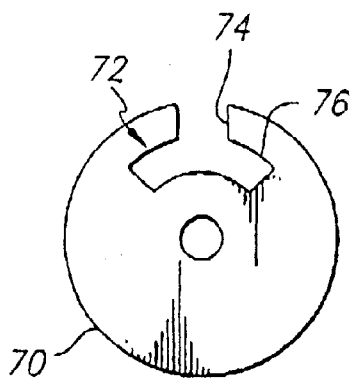
FIG. 7 is a right (outer) side elevation view of an outer lock plate.
Figure 8:
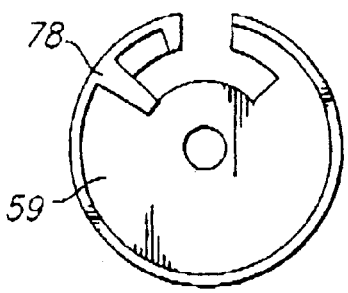
FIG. 8 is a left (inner) side elevation view of the outer lock plate.
Figure 9:
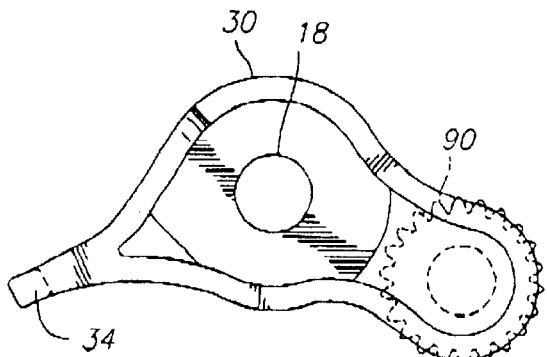
FIG. 9 is a right (outer) side elevation view of a shift arm.
Figure 10:
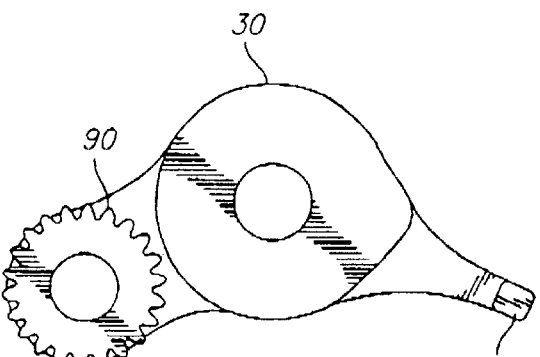
FIG. 10 is a left (inner) side elevation view of the shift arm.
Figure 11:
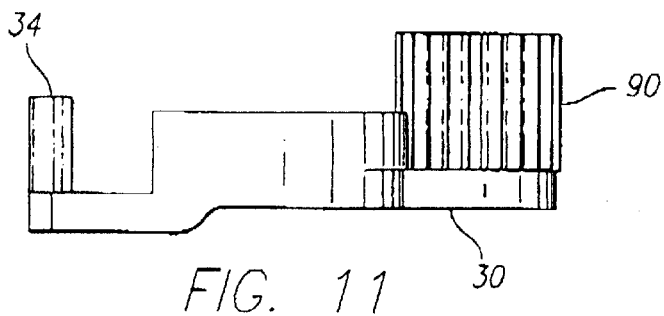
FIG. 11 is a top plan view of the shift arm.

As seen in FIGS. 6 and 8 which show the facing sides of the inner and outer lock plates 50, 70 respectively, two rotation limit stops 58 and 59 are provided on the outer side of the inner lock plate 50 and a single rotation limit stop 78 is formed on the inner side of the outer lock plate 70. Rotation of the outer lock plate 70 is confined to the angle between the disc shoulders 45, 46 which are engaged by the outer lock plate stop 78 at the ends of travel of the outer lock plate. Rotation of the inner lock plate 50 relative to the outer lock plate 70 is confined to the angular spacing between the stops 58, 59 which are also engaged by the outer lock plate stop 78. It will be noted that in the embodiment shown, rotation of the outer lock plate 70 relative to the inner lock plate 50 is defined by the excess by which the angular length of the slot 56 in the inner lock plate exceeds the angular length of the slot 76 in the outer lock plate.

The facing sides of the inner lock plate 50 and outer lock plate 70 are also preferably also configured to define a generally cylindrical cavity or recess 59 in which the semi-circular disc 44 is received.

Figure 14A:
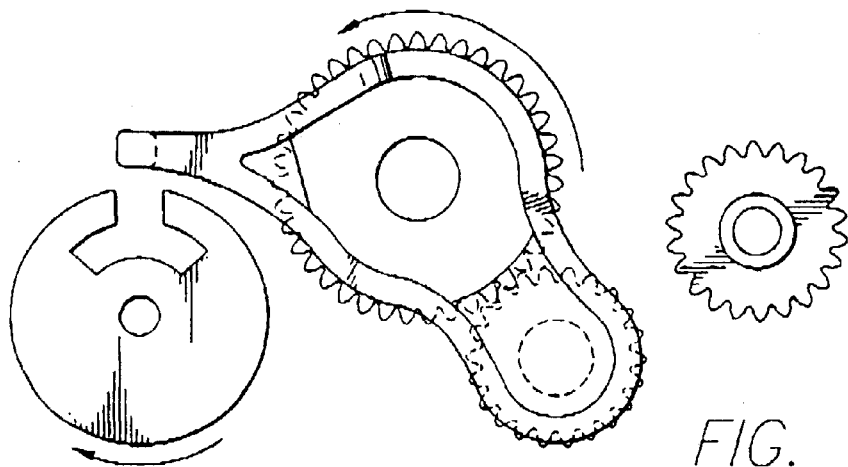
FIG. 14 comprises schematic views of sequential positions of the shift arm, lock plates and shift gear.
Figure 14B:
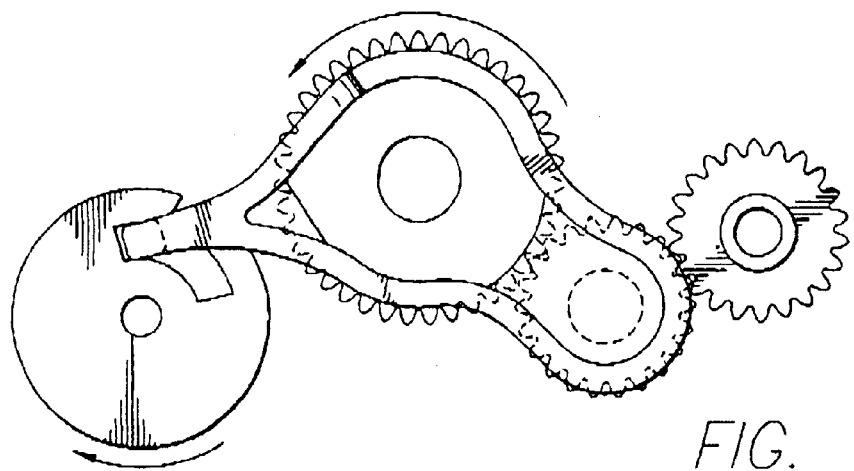
Figure 14C:
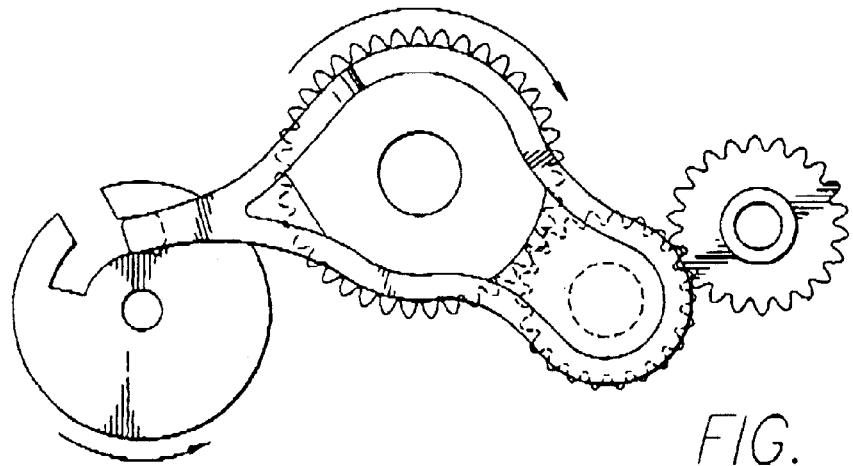

Operation of the transmission will now be described with reference to the sequence of positions schematically shown in FIG. 14 starting with FIG. 14a which shows the transmission after disengagement with the radial gates 54, 74 in the lock plates remaining aligned and the pawl 34 positioned externally of the lock plate sockets. Counterclockwise rotation of the sun gear 20 will be assumed to be the forward direction of rotation and clockwise rotation of gear 20 will be reverse. Forward rotation urges the pawl 34 radially toward the lock plates due to frictional engagement of the sun gear 20 and shift arm 30, causing the pawl 34 to enter the gates 54, 74 when the gates are aligned. Conversely, reverse rotation causes the pawl 34 to exit the sockets 52, 72 when the pawl 34 is aligned with the gates 54, 74 and when the gates 54, 74 are aligned with each other.

The transmission is engaged by first rotating the input gear 20 by a programmed motor through a selected angle in a reverse direction to ensure that the pawl 34 has been pivoted out of the lock plate sockets 52, 72 and then rotating the input gear 20 in the forward direction to cause the pawl 34 to enter the sockets in the lock plates to permit the shift gear 90, driven by the input gear 20, to pivot into engagement with the output gear 80. The lock plate 50 then rotates clockwise due to frictional engagement with the clutch gear 60 and the lock plate 70 is rotated clockwise due to engagement of the inner lock plate stop 58 with the outer lock plate stop 78 until the pawl 34 contacts the left ends of the gate slots 56, 76 as seen in FIG. 14b. At this time the outer lock plate stop 78 also contacts the right side disc shoulder 46 to prevent further clockwise rotation of the outer lock plate 70. When the motor is driven in the reverse direction, the pawl 36 hits the right ends of the slots 56, 76 as seen in FIG. 13c, reverse torque then being applied to the output gears 80, 82.

The transmission is disengaged after forward drive by first rotating the input gear 20 in reverse which frictionally rotates the inner lock plate 50 counterclockwise and the outer lock plate counterclockwise due to engagement of the stops 59 and 78 until rotation of the outer lock plate 70 is terminated by engagement of the stop 78 with the left shoulder 45 of the disc 44. The inner lock plate 50 continues to rotate counterclockwise for only the necessary angular distance under programmed control of the motor for a selected angle until the gates 54, 74 are aligned. The motor then drives the transmission forward until gates align with the pawl 36 which then permits the pawl 34 to exit the sockets 52, 72 under frictional urging by the face to face contact of the shift arm 30 with the sun gear 20.

The transmission is disengaged after reverse drive by rotating the motor forwardly for the precise angle until the gates align with the pawl 36 which then exits the sockets 52, 72.

The transmission can only be engaged with precise controlled reverse rotation and can only be disengaged by programmed precise forward and then reverse rotation. If the reverse rotation angle is shorter or longer than the prescribed amount, then the transmission will not engage. Likewise, if the angles of rotation in the forward and reverse directions are incorrect the transmission will not disengage. The precise angles of rotation of the input gear 20 to cause engagement or disengagement of the transmission as desired are accurately controllable through programming of the input motor which applies torque to the input gear 20 or gear train 20, 22, 24.

Two lock plates 50, 70 are shown in the described embodiment but it will be appreciated that a transmission can be constructed with more than two lock plates such that multiple programmed reverse and forward rotations of the input gear 20 by a motor are required to cause engagement and disengagement.

When the transmission is disengaged, i.e., when the pawl 34 is clear of the lock plate sockets 52, 72, the lock plate 50 is permitted to freely rotate on the clutch shaft since the inner lock plate 50 is friction coupled to the clutch gear 60 and turns with the gear 60 since the pawl 34 is clear of the sockets. Rotation of the outer lock plate 70 is caused and the angles of rotation thereof are limited by engagement of the stops 58 or 59 with stop 78 and by engagement of stop 78 with the disc shoulders 45, 46 which create a hysteresis or dead band of rotation of selected arcuate length. Only one particular sequence of forward and reverse input motions is required to engage the transmission and a second and different sequence is used to disengage the transmission. The sequences can be designed to be equal to each other but in this implementation are not the same.

The preferred embodiment therefore allows selective engagement or disengagement of the transmission with merely the proper programmed forward and reverse rotation of the input motor. The transmission can be used to transmit torque in both the forward and reverse directions without disengagement and can be disengaged when not in use to reduce parasitic power consumption. Adjustment of the angular extent of the lock plate slots 56, 76 and angular spacing between the stop shoulders 45, 46 on the clutch shaft disc 44 and the spacing and configuration of the mutually engageable stops 84, 86 on the inner and outer output gears 80, 82 (if two output gears are provided), permits variation of the engagement and disengagement sequences and optionally designed motion lag thus allowing for a single motor to selectively power a number of devices independently or simultaneously. The design is entirely mechanical requiring no external input, either mechanical, electrical or otherwise beyond the easily programmable rotational power input of the torque of drive torque.

Persons skilled in the art will also appreciate that various additional modifications can be made in the preferred embodiment shown and described above and that the scope of protection is limited only by the wording of the claims which follow.

What is claimed is:

1. A transmission for transmitting rotary power in forward and reverse directions from a source of rotary power to a load comprising:

a) a rotary input gear for coupling to said source of rotary power;

b) a rotary output gear;

c) a clutch shaft;

d) a clutch gear rotatably mounted on said clutch shaft and drivingly engaged with said input gear;

e) at least one lock plate rotatably mounted on said clutch shaft in frictional engagement with said clutch gear, said lock plate having a socket therein including a radially extending gate having an angular width and an arcuate slot of first selected angular length greater than said arcuate width of said gate, said slot accessed by said gate;

f) a shift arm pivotally mounted coaxially with said input gear and frictionally engaged with said input gear, said shift arm including a pawl arcuately moveable into and out of engagement with said lock plate socket; and g) a shift gear engaged with said input gear, said shift gear being mounted on said shift arm and arcuately moveable with said shift arm between positions of engagement and disengagement with said output gear as said pawl moves into and out of said socket.

2. The transmission of claim 1, wherein said at least one lock plate comprises an inner lock plate and further comprising an outer lock plate rotatably mounted on said clutch shaft, said outer lock plate having a socket therein including a radially extending outer gate and an arcuate slot of second selected angular length accessed by said gate, said inner lock plate and said outer lock plate having mutually engageable stops thereon for rotating said outer lock plate by rotation of said inner lock plate and for limiting rotation of said outer lock plate relative to said inner lock plate to a third angular length.

3. The transmission of claim 1, further comprising a spring urging said inner lock plate into frictional engagement with said clutch gear.

4. The transmission of claim 1, further comprising a spring urging said shift arm into frictional engagement with said input gear.

5. The transmission of claim 2, wherein said third angular length comprises the angular length by which said first angular length differs from said second angular length.

6. The transmission of claim 2, wherein said clutch shaft includes a lock plate rotation limiter having rotation stops thereon spaced from each other by a fourth angular length, a rotation stop on said outer lock plate being engageable with said rotation stops on said limiter to limit rotation of said outer lock plate relative to said clutch shaft to said fourth angular length.

7. The transmission of claim 6, wherein said limiter is positioned in a recess between said inner lock plate and said outer lock plate.

8. The transmission of claim 6, where in said output gear is comprised of coaxially mounted first and second output gears, said first output gear being driven by said shift gear and said second output gear being rotatable by said first output gear when said transmission is engaged.

9. The transmission of claim 3, further comprising a spring urging said outer lock plate toward said inner lock plate.

10. The transmission of claim 8, further comprising mutually engageable stops on said first and second output gears for permitting said second output gear to commence rotation after commencement of rotation of said first output gear through a selected angle by said shift gear during engagement of said transmission.

* * * * *